United States Patent [19]

Horn

[11] 3,781,470

[45] Dec. 25, 1973

[54] PHASE CONTROL SYSTEM FOR SIGNAL CONDITIONING CIRCUITS

[75] Inventor: John J. Horn, Beaverton, Oreg.

[73] Assignee: Tektronix, Inc., Beaverton, Oreg.

[22] Filed: Oct. 27, 1971

[21] Appl. No.: 192,818

[52] U.S. Cl. ........ 178/7.3 R, 178/69.5 TV, 315/19, 328/155, 333/18

[51] Int. Cl......... H04n 5/04, H03b 3/04, H04b 3/04

[58] Field of Search ...................... 178/7.3 R, 7.5 R, 178/69.5 TV, 69.5 DC; 315/18, 19; 333/18; 328/155; 325/42

[56] References Cited

UNITED STATES PATENTS

| | | | |
|---|---|---|---|
| 3,311,702 | 3/1967 | Legler | 178/69.5 TV |
| 3,575,666 | 4/1971 | Fischman | 178/69.5 TV |

*Primary Examiner*—Robert L. Richardson
*Assistant Examiner*—George G. Stellar
*Attorney*—Stephen W. Blore et al.

[57] ABSTRACT

A phase modulator produces a controlled variable phase shift in the input signal being supplied to a signal conditioning circuit so as to maintain the total phase shift between the original input signal and the output signal of such circuit at a predetermined constant value, even though such circuit itself produces undesirable or spurious and unpredictable varying phase shifts in the signal being modified due to changing circuit conditions such as changes in temperature of components in the circuit, changes in current flow through such components or changes in voltage applied to such components. A phase comparator compares a portion of the output signal of the signal conditioning circuit with a portion of the input signal and supplies a control voltage to the phase modulator. This control voltage causes the phase modulator to vary the phase shift of the input signal in a direction resulting in such constant phase shift. The disclosed signal conditioning circuit is a horizontal deflection circuit for a television monitor. In the phase comparator, a selected portion of blanking pulses at the output of the deflection circuit and a selected portion of alternate cycles of a symmetrical square wave from a horizontal oscillator are employed to set and reset a gating multivibrator to produce an unsymmetrical square wave which gates an integrator. The output of the integrator is a control voltage which varies with any variations in the time interval between such selected portions of the blanking pulse and input signal. The circuit shown may also include a synchronizing circuit for synchronizing the horizontal oscillator with synchronizing pulses derived from a television signal.

7 Claims, 3 Drawing Figures

PHASE CONTROL SYSTEM FOR SIGNAL CONDITIONING CIRCUITS

BACKGROUND OF INVENTION

Signal conditioning circuits such as amplifiers, modulators, frequency scalers, deflection circuits and the like frequently introduce spurious or uncontrolled phase shifts in the signal being modified. These phase shifts can be the result of changes in operating characteristics or values of components of the circuits caused by such things as temperature changes or changes in voltages or currents in the circuit, and are often unpredictable or in any case difficult to predict. Particularly where time is a factor, these phase shifts deleteriously affect the operation of the circuits. For example, in instruments for measuring time delay or phase relationships of signals in electrical circuits, any results of such measurements will be of uncertain accuracy unless the amount of phase shift in the measuring circuit is definitely known.

The prior approach to overcoming these difficulties has been an attempt to produce components which do not change their properties under the conditions in which they are employed, or to attempt to match each circuit component with other components which as nearly as possible produce equal and opposite effects in the circuit. In many instances this is not possible.

The present invention was developed in connection with the design of a television monitor employed for checking the operation of television circuits including the determination of the phase relationships of the various signals in the deflection circuits of television equipment and the stability of such phase relationships. Such television monitors desirably have extremely stable deflection circuits to provide a standard of comparison for the deflection circuits, and ancillary circuits, of the equipment being monitored.

The horizontal deflection circuits of the monitors typically contain a resonant circuit formed by the horizontal deflection coil and suitable capacitors. Such resonant circuit is driven by a high voltage power transistor in turn driven by a high beta power transistor, the two transistors being connected in cascode and both being driven to saturation. Among other things the carrier storage in such transistors causes a time delay or phase shift of the deflection current in the deflection coil and also a similar delay of the blanking pulse derived from the flyback voltage of the deflection circuit. A constant delay would not be objectionable but the actual delay changes in an unpredictable manner.

SUMMARY OF THE INVENTION

In accordance with the present invention, it has been found that the overall delay of the output signal of the deflection circuit with respect to the input signal can be made a predetermined substantially constant time. This is accomplished by employing a phase modulator to produce a delaying phase shift in the input signal supplied to the horizontal deflection circuit of a television monitor, and also employing a phase comparator to compare a selected portion of the output signal of the deflection circuit with a selected portion of such input signal. The phase comparator produces a control voltage for the phase modulator which varies with the time difference between such selected signal portions. The control voltage is employed to cause the phase shift produced by the phase modulator to vary in an amount equal and opposite to the resultant of all of the phase shifts which occur in the deflection circuit so that the total delay or phase shift between the output signal and the input signal is a known amount, which is a constant within the limits of experimental error. That is to say, any error due to a variation of the actual delay time between the output signal and the input signal from the predetermined delay time results in an error signal which causes the phase modulator to correct the error.

It is apparent from the discussion in the above paragraph that the delay control of the present invention is applicable to any signal modifying circuit which produces a phase shift or delay between its input signal and output signal and in which such phase shift does not remain constant.

DESCRIPTION OF THE PREFERRED EMBODIMENT

Figures 1, 3:
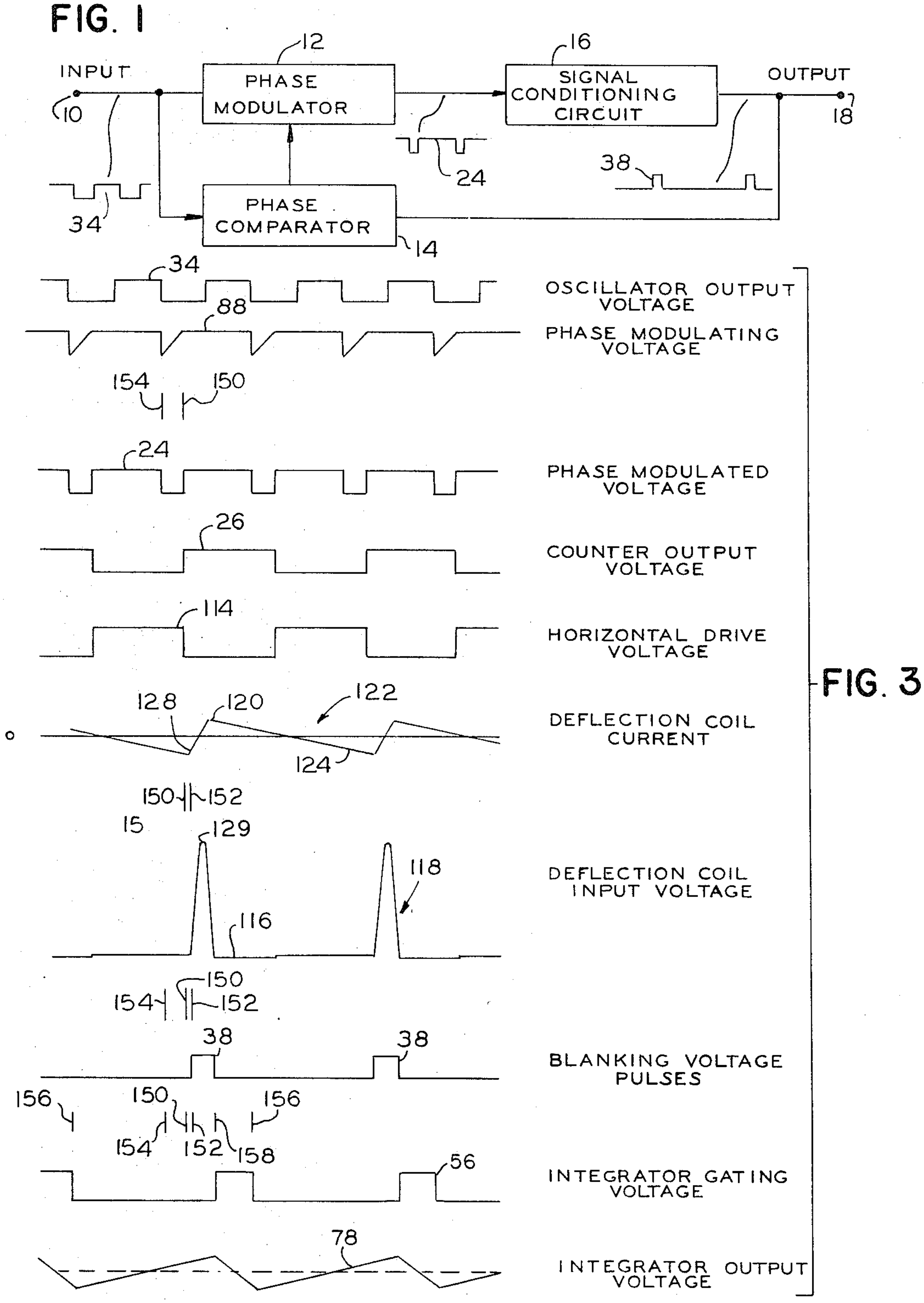
FIG. 1 is a simplfied block diagram of the circuit of the present invention.
FIG. 3 is a graph showing signal wave forms present in the circuit of FIG. 2.

The simplified diagram of FIG. 1 includes an input terminal 10 for an input signal which is delivered to a phase modulator 12 and to a phase comparator 14. The phase modulator produces a controlled phase shift in at least a portion of the input signal. The phase modulated input signal is delivered to a signal conditioning circuit 16 which modifies the input signal to condition it for some particular usage. Such signal conditioning circuit is of a type which causes an unpredictable or difficultly predictable varying delay or phase shift in the signal being modified.

The delayed and conditioned output signal from the signal conditioning circuit 16 is fed back to the phase comparator 14 in which a selected portion of the output signal is compared with a selected portion of the input signal to produce a control voltage which is delivered to the phase modulator 12 to control the amount of phase shift of the input signal produced by the phase modulator 12. The time interval between the selected portions of the input and output signals is a function of the total delay in the phase modulator 12 and conditioning circuit 16, and the phase comparator 14 detects any difference between this time interval and a predetermined time interval. If the time interval between the selected portions of the input and output signals is greater than the predetermined time interval, the control signal from the phase comparator 14 causes the phase modulator 12 to decrease the time delay caused by such phase modulator, and vice versa, to thus keep the total time delay effectively constant. The signal delivered to the output terminal 18 thus has a constant predetermined delay or phase shift even though the signal conditioning circuit 16 causes an unpredictable varying delay.

Figure 2:
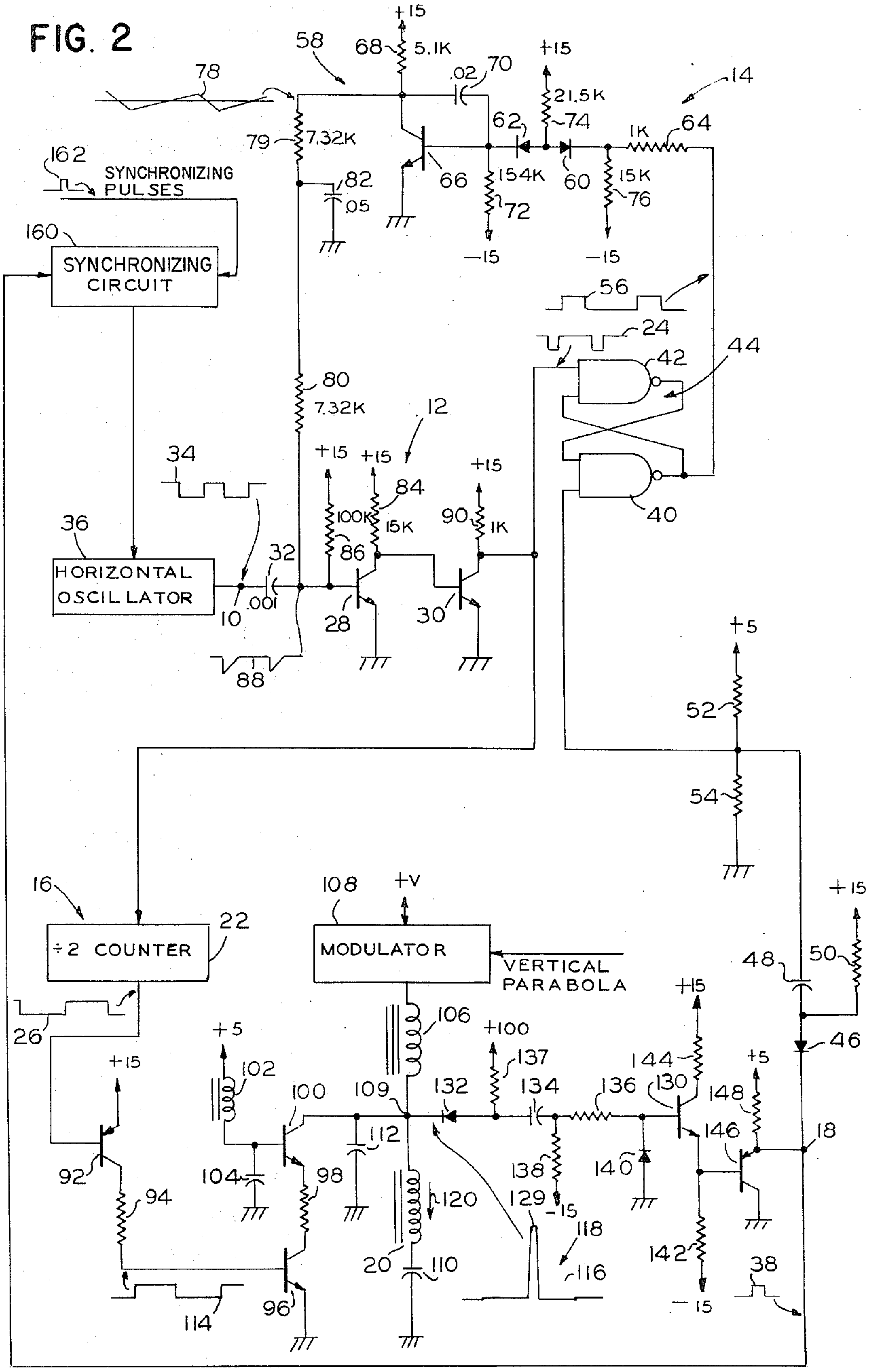
FIG. 2 is a schematic diagram showing details of an example of a circuit in accordance with FIG. 1 with certain of conventional portions of the circuit shown as blocks.

In the more detailed circuit diagram of FIG. 2, the signal conditioning circuit 16 is shown as a horizontal deflection circuit for a magnetic deflection type cathode ray tube of a television monitor, the horizontal deflection coil of the deflection yoke of such tube being shown at 20. Although the details of this deflection circuit are not a part of the present invention, this deflection circuit and its operation will be described at considerable length in order to provide a complete disclosure of an operative circuit embodying the present invention.

The deflection circuit 16 includes a divide by two counter 22 which receives a phase modulated input signal 24 from the phase modulation circuit 12 and produces a symmetrical square wave output 26 at the scanning line frequency of the television monitor.

The phase modulator circuit includes a pair of NPN transistors 28 and 30, and an input capacitor 32 connected between the base of the transistor 28 and the input terminal 10 for the phase modulator 12 and phase comparator 14. The input terminal 10 is shown as being the output of a horizontal oscillator 36. This input signal is a symmetrical square wave voltage 34 having a frequency which is twice that of the scanning line frequency of the television monitor. The positive going voltage transistions only of the square wave voltage 34 are phase shifted in the phase modulator 12, while the negative going transitions are not phase shifted so that the negative going voltage transitions of the phase modulated voltage 24 are still coincident with the negative going transitions of the input signal 34.

As further described below, positive blanking pulses 38 are produced at the output terminal 18 of the horizontal deflection circuit 16 and the negative going transitions of such pulses are compared in the phase comparator 14 with alternate negative going transitions of the phase modulated signal 24 and therefor with the negative going transitions of the input signal 34 from the horizontal oscillator 36, in order to obtain a control voltage which is delivered to the phase modulator 12.

The phase comparator includes a pair of cross connected nand gates 40 and 42 forming a bistable multivibrator 44 which is caused to change from a first stable state to a second stable state by the negative going transition of the voltage 24 coincident with the negative going transition of the input voltage 34 and applied to an input terminal of the nand gate 42. The multivibrator is reset to its first stable state by a negative going transition coincident with the negative going transition of the blanking pulse 38 at the output 18 of the horizontal deflection circuit 16. This negative going transition is applied to an input terminal of the nand gate 40 through a DC level setting circuit including a diode 46 and a capacitor 48 connected in series between the terminal 18 and such input terminal of the nand gate 40.

The diode 46 has its cathode connected to the terminal 18 and its anode connected to the capacitor 48 and to a source of positive potential so that the capacitor 48 charges during the pulse 38 to enable the negative going transition of the blanking pulse to drive the input terminal of the nand gate 40 to a negative potential. Resistors 52 and 54 are connected in series between a source of positive potential and chassis ground, and have their common terminal connected to the input terminal of the nand gate 40 to maintain this input terminal at a predetermined positive level except during the negative going transition of the blanking pulse 38.

The negative going transition applied to the input terminal of the nand gate 40 resets the multivibrator to its first stable state to provide a positive level of voltage at the output of the nand gate 40. The next occurring non phase shifted negative going voltage transition of the signal 24 causes the multivibrator to change to its second state in which the voltage at the output of the nand gate is at its negative level. The result is an unsymmetrical square wave output voltage 56 which is delivered to an integrator circuit 58 as an integrator gating voltage.

The integrator gating voltage 56 has a frequency equal to the scanning line frequency of the deflection circuit and remains at its negative voltage level during time intervals which increases with any increase in the total delay or phase shift between the input signal at the terminal 10 and the output signal at the terminal 18. Conversely the gating voltage 56 remains at its positive level for time intervals which decrease with any increase in such delay.

The integrator circuit 58 includes a pair of diodes 60 and 62 having their anodes connected together and connected in a series circuit with a resistor 64. This series circuit is connected between the output of the gating multivibrator 44 and the base of an NPN transistor 66. This transistor has an emitter connected to chassis ground and its collector connected through a resistor 68 to a source of positive potential and also through an integrating capacitor 70 to the base of such transistor. The base of the transistor is also connected to a source of negative potential through a resistor 72. The terminal between the anodes of the two diodes 60 and 62 is connected to a source of positive potential through a resistor 74, and the cathode of the diode 60 remote from the base of the transistor 66 is connected to a source of negative potential through a resistor 76.

When the gating voltage 56 is at its positive level the diode 60 is cut off and the diode 62 is conducting. At this time the current flow through the resistor 74 and diode 62 from a positive sourve of potential is greater than the current flow through the resistor 72 to a negative source of potential. The difference in current charges the integrating capacitor 70 at a uniform rate. The output voltage of the integrator at the collector of the transistor during this time is the negative going ramp portion of an integrated voltage waveform 78. When the integrator gating voltage 56 changes to its negative level, the diode 62 is cut off and the capacitor 70 discharges through the resistor 72 at a uniform rate to produce the positive going linear ramp portion of such waveform 78.

The collector of the transistor 66 is connected to the base of the transistor 28 of the phase modulator circuit 12 through resistors 79 and 80 connected in series and having a shunt capacitor 82 connected between the common terminal of such resistors and chassis ground.

The collector voltage of the transistor 66 is always at a positive potential with respect to the base of the transistor 28, and the circuit including the resistors 79 and 80 and capacitors smooths or filters the integrator output voltage 78 to cause a substantially uniform current to flow into the terminal between the capacitor 32 and the base of the transistor 28. This current however varies with the relative lengths of the positive and negative ramps of the integrator output voltage 78. This current increases as the length of the positive going ramp of the voltage 78 increases and the length of the negative going ramp decreases and vice versa. Thus this current increases as the total time delay in the phase modulator 12 and the horizontal deflection circuit 16 increases and vice versa.

The transistor 28 has its emitter connected to chassis ground and its collector connected to a source of positive potential through a load resistor 84, and also has its base connected to a source of positive potential through a resistor 86 so that a substantially uniform current also flows through the resistor 86 into the junction between the capacitor 32 and the base of the transistor 28.

When the voltage at the base of the transistor 28 is positive and equals the base-emitter junction forward voltage, this transistor is turned on and the total current flowing through the resistors 80 and 86 flows to chassis ground through the base-emitter junction so that the voltage at such base is clamped with respect to ground at such base-emitter forward voltage, i.e., at the positive level of the voltage 88 at the base of the transistor 28. The collector of the transistor 28 is connected to the base of the transistor 30 which has its emitter connected to a chassis ground and its collector connected to a source of positive potential through a load resistor 90. When the transistor 28 is turned on the transistor 30 is turned off and the voltage 24 at the collector of the transistor is at its positive level.

When the input voltage 34 changes from its positive to its negative level, the voltage 88 at the base of the transistor 28 is driven in a negative direction to cut off this transistor and causes the transistor 30 to be turned on resulting in the voltage 24 at the collector of the transistor changing to its negative level. This negative going transition of the voltage 24 is therefor not phase shifted and is coincident with the negative going transtion of the input signal voltage 34.

When the transistor 28 is turned off, the currents flowing through the resistors 80 and 86 charge the capacitor 32 to produce the positive going ramp of the voltage 88. The slope of this ramp is therefor a function of the current through the resistor 80 from the collector of the transistor 66 forming part of the integrator circuit 58 and increases as this current increases and vice versa. When the positive going ramp of the voltage 88 reaches the base-emitter forward voltage of the transistor 28, this transistor turns on and the voltage 24 at the collector of the transistor 30 again goes positive.

The time interval during which the voltage 24 is negative is the time interval during which the ramp of the voltage 88 is being produced and is the delay time by which the phase modulator 12 delays a portion of the input signal 34. Thus the negative going transition of the voltage 24 which is in phase with a portion of the input signal 34 and is compared with the output signal of the horizontal deflection circuit 16 in the phase comparator circuit 14, and it is the positive going transition of the voltage 24 which is employed to drive the counter of the signal conditioning circuit at a controlled time delay after the negative going transition of the voltage 24.

The negative going transitions of the symmetrical square wave output voltage 26 of the divide by two counter 22 are coincident with alternate ones of the phase shifted positive going transitions of the voltage 24 at the output of the phase modulator 12. This voltage 26 is supplied to the base of a PNP horizontal amplifier transistor 92 having its emitter connected to a source of positive potential and its collector connected through a resistor 94 to the base of a high beta, high current NPN transistor 96. The transistor 96 has its emitter connected to chassis ground and its collector connected through a resistor 98 to the emitter of a high voltage, high current transistor 100 having its base connected to a source of positive potential through a choke 102 and to chassis ground through a capacitor 104.

The collector of the transistor 100 is connected through a choke 106 to a modulator 108 which in turn is connected to a positive source of potential so as to provide a current source for the transistors 100 and 96 and the horizontal deflection coil 20, which has one terminal 109 connected to the collector of the transistor 100 and its other terminal connected through a capacitor 110 to chassis ground. The terminal 109 is also connected through a high voltage capacitor 112 to chassis ground.

The deflection circuit drive voltage 114 at the base of the transistor 96 is a symmetrical square wave which has the same frequency as the square wave voltage 26 from the counter 22 and is inverted with respect to such square wave voltage 26. When the voltage 114 goes to its most negative level, the transistors 96 and 100 are both turned off. The current flowing in the deflection coil 20, which at this time is in a direction opposite to that of the arrow 120 adjacent the deflection coil, must continue flowing in the same direction, due to the inductive nature of such coil. The capacitor 112 has a low value of capacitance compared to the capacitor 110 and the circuit at the terminal 109 presents a high impedance to continued flow of the negative current through the deflection coil and causes the current to rapidly decrease to zero as shown at 128 on the current curve 122. This current however charges the capacitor 112 to a high flyback voltage 129 produced by collapse of the field in the deflection coil, as indicated by the rapid rate of change of current during the initial negative current portion of the positive going ramp 128 of the current curve 122 of FIG. 3. The high positive voltage 129 at the terminal 109 causes the current in the deflection coil to reverse and quickly build up in a positive direction to discharge the capacitor 112 and rapidly reduce the flyback voltage.

The collector-base junction of the transistor 100 functions as a damping diode to prevent the voltage at such collector from going negative, the capacitor 104 acting as a current sink. The voltage at the collector of the transistor thus returns to the level 116 of the deflection coil input voltage 118. At this time the constant voltage applied to the deflection coil 20 causes the current to decay linearly toward zero. The time constants of the circuits are such that zero current occurs at approximately the time that the deflection drive voltage 114 goes positive to turn on the transistors 100 and 96.

Upon reversal of the deflection coil current and turning on of the transistors 100 and 96, the voltage at the collector of the transistor 100 and at the terminal 109 increases by a small amount as indicated by the voltage curve 118. The capacitor 110 provides a current sink for the deflection coil and such transistors to produce the negative current portion 124 of the negative going current ramp of the deflection coil current curve 122 shown in FIG. 3.

The negative current through the deflection coil 20 builds up until the deflection drive voltage 114 again goes negative to cut off the transistors 100 and 96. The deflection cycle just described repeats under control of the deflection drive voltage 114 which in turn is controlled by the positive going phase shift excursion of the output voltage of the phase modulator circuit.

The modulator 108 modulates the current supplied to the horizontal deflection circuit 16 through the choke 106 in accordance with a parabolic voltage derived from the vertical deflection circuit and at the frequency of the vertical deflection current to provide horizontal pincushion correction of the horizontal deflection. This modulation of the current supply to the horizontal deflection circuit affects the value of the currents through the components of such deflection circuit and contributes to the variation of phase shift produced in such deflection circuit.

A blanking pulse shaping circuit includes an NPN transistor 130 having its base connected to the terminal 109 through a diode 132, a capacitor 134 and a resistor 136 in series. The diode has its cathode connected to such terminal and its anode connected through a resistor 137 to a source of positive potential. When the collector of the transistor 100 is close to chassis ground potential, the anode of the diode 132 and the terminal of the capacitor connected to such anode is also close to chassis ground potential.

The terminal of the capacitor 134 remote from the diode 132 is connected to a source of negative potential through a resistor 138 and to the base of the transistor 130 through resistor 136. The base of such transistor is connected to the cathode of a diode 140 having its anode connected to chassis ground. The transistor 130 has its emitter connected to a source of negative potential through a load resistor 142 and its collector connected to a source of positive potential through a resistor 144 so that such transistor functions as an emitter follower.

The circuit including the diode 140 and resistors 136 and 138 normally clamp the voltage at the base of the transistor 130 slightly negative with respect to chassis ground so that the emitter of this transistor is also negative with respect to chassis ground. The emitter of the transistor 130 is also connected to the base of a PNP transistor 146 having its collector connected to chassis ground and its emitter connected through a resistor 148 to a source of positive potential. The transistor 146 is thus also connected as an emitter follower so that the two transistors 130 and 146 form a current amplifier for the wave form which is applied to the base of the transistor 130. This wave form is a positive pulse which has the form of the pulse 38 at the emitter of the transistor 146 and which is in phase with the flyback voltage 129 at the collector of the transistor 100.

When the voltage of the collector of the transistor 100 is near chassis ground potential, the voltage at the anode of the diode 132 is also near ground potential. When the flyback voltage makes its positive going transition, the voltage applied to the capacitor goes positive until the diode 132 cuts off at the positive potential to which its anode is connected. This voltage drives the base of the transistor 130 positive. The negative going transition of the flyback voltage has no effect until the value of the positive flyback voltage drops below the potential of positive voltage source connected to the anode of the diode 132, at which time such negative going transition is applied to the base of the transistor 130. The result is a positive going clipped positive pulse 38 at the emitter of the transistor 146.

As described above the negative going transition of the pulse 38 is employed to cause resetting of the multivibrator 44 from its second to its first stable state to produce the positive level of the gating voltage 56 for the integrator circuit of such comparator circuit, and it is the negative transition of the input signal 34 which results in the changing of the multivibrator to such second stable state to produce the positive level of the gating voltage 56.

Referring to the curves of FIG. 3, the delay or phase shift caused by the horizontal deflection circuit can be defined as the time interval between a negative going transition of the horizontal drive voltage 114 and the time when the transistors 100 and 96 actually turn off to initiate the positive going portion of the flyback voltage 129 at the input terminal 109 of the deflection coil 20. This delay is indicated by the time interval between the vertical lines 150 and 152 on FIG. 3. The delay of a portion of the input signal by the phase modulator is indicated by the time interval between the lines 154 and 150 so that the total delay in the circuit including the phase modulation of the input signal is the interval between the lines 154 and 152.

The time interval during which the integrator gating voltage 58 is at a negative level is the sum of this total delay and two constant delay times. One of these constant delay times is the interval between the line 156 and the line 154 which is equal to one cycle of the input voltage 34. The other constant delay is the interval between the lines 152 and 158, which is the time interval of a blanking pulse 38. The time interval of such negative level of the integrator gating voltage is thus a linear function of the total delay in the circuit.

The time inteval of the positive level of the integrator gating voltage 58 is the time interval of two cycles of the input signal 34 minus the time interval of the negative level of such gating voltage. If the time interval of the negative level increases, the time interval of the positive level of the integrator gate voltage 58 decreases and vice versa. As described above, such an increase in the time interval of the negative level of the voltage 58 due to an increase in the total delay in the circuit causes the control voltage from the integrator circuit 58 to the phase modulator 12 to increase to thus decrease the delay by the phase modulator to hold the total delay very nearly constant.

Although, for purposes of explanation, the time delay in the illustrated horizontal deflection circuit has been defined as the time between a negative transition of a horizontal drive voltage 114 for the NPN transistors 96 and 100 tending to turn these transistors off and the actual turning off of these transistors, since this is the major variable delay in such circuit, it should be pointed out that variations in any other delays which may occur in such circuit will also be corrected by the delay control circuit of the present invention. The rate at which the corrections occur can be varied over a considerable range by changing the values of components of the integrating circuit 58. In the present circuit, using the values of the components shown, this rate is sufficiently great that any variation in the phase shift or delay due to the modulation of the current supplied to the horizontal deflection circuit at the field frequency of 60 cycles per second is substantially reduced.

In order to further show the relation of the present circuit to the other circuits of a television monitor, the horizontal oscillator 36 may be controlled by a synchronizing circuit which compares the phase relation between the blanking pulses 38 from the output terminal of the terminal 18 of the horizontal deflection circuit 16 with synchronizing pulses 162 from the video circuits of such monitor in order to maintain a predetermined phase relation between such synchronizing pulses and the deflection currents in the deflection coil 20. I claim:

1. A phase control system which compensates for a signal conditioning circuit causing a variable phase shift between an input signal for said circuit and output signal from said circuit in which the improvement comprises:

phase modulator means for producing a controlled phase shift in selected portions only of said input signal and delivering the phase shifted portions of the phase modulated input signal to said circuit so that the phase shifted portions are employed to cause said circuit to produce said output signal, said output signal being derived from said input signal;

and phase comparator means, including gate means for selecting nonphase shifted portions of the phase modulated input signal, for comparing selected portions of said output signal with said nonphase shifted portions of said phase modulated input signal and producing a control signal which is a function of the total phase shift of said output signal with respect to said input signal of said phase modulator;

said phase modulator means including means responsive to said control signal for varying said controlled phase shift to maintain said total phase shift substantially constant.

2. The phase control system of claim 1 in which:

said phase modulator includes means for producing successive voltage ramps each starting at a first voltage level and at a time coincident with a selected portion of said input signal and terminating when said ramp reaches a second voltage level and producing a controlled phase shift of a portion of said input signal of said phase modulator equal to the time interval between the start and termination of such ramps;

and includes means responsive to said control signal to vary the slope of said ramps to vary the time value of said controlled phase shift.

3. The phase control circuit of claim 1 in which:

said phase comparator includes gate means for producing an integrator gating voltage having repetitive cycles of constant time duration and having one voltage level for a time interval which is less than said constant time duration and which is a function of said total phase shift and having a different voltage level for a time interval which is the difference between said constant time duration and said time interval;

and integrator means gated by said integrator gating voltages for integrating a voltage of one polarity during one of said time intervals and for integrating a voltage of a different polarity during the other of said time intervals to produce as said control signal a control voltage which is a function of said total phase shift.

4. The phase control system of claim 3 in which:

said gate means for producing said integrator gating voltage is a bistable multivibrator which is reset from a second stable state to a first stable state in response to each of said selected portion of said output signal and is caused to change back to said second stable state in response to the next successive selected portion of said input signal of said phase modulator.

5. The phase controlled system of claim 4 in which:

said signal conditioning circuit is a horizontal deflection circuit of a television monitor and said phase comparator includes means for selecting portions of each of a series of blanking pulses forming an output signal of said deflection circuit to reset said multivibrator.

6. The phase control system of claim 1 in which:

said signal conditioning circuit is a horizontal deflection circuit of a television monitor and said phase comparator means includes means for selecting a portion of each of a series of unblanking pulses forming an output signal of said circuit for comparison with said selected portions of said input signal of said phase modulator.

7. The phase control system of claim 6 in which:

said system also includes synchronizing means responsive to the selected portions of said unblanking pulses and to synchronizing pulses from video circuits of said monitor for synchronizing said system with said synchronizing pulses.

* * * * *